US006711002B1

(12) United States Patent
Fan

(10) Patent No.: US 6,711,002 B1
(45) Date of Patent: Mar. 23, 2004

(54) EXPANDABLE HOUSING FOR ELECTRONICS DEVICE

(75) Inventor: Cheng-Yuan Fan, Taipei (TW)

(73) Assignee: First International Computer Inc., Taipei (TW)

( * ) Notice: Subject to any disclaimer, the term of this patent is extended or adjusted under 35 U.S.C. 154(b) by 0 days.

(21) Appl. No.: 10/379,664

(22) Filed: Mar. 6, 2003

(51) Int. Cl.⁷ .................................................. H05K 7/14
(52) U.S. Cl. .................... 361/679; 361/725; 312/223.3; 364/708.1
(58) Field of Search ................................ 361/679–687, 361/724–727; 312/223.1–223.6; 364/708.1; 292/DIG. 17, DIG. 30; 70/58–59; 345/168

(56) References Cited

U.S. PATENT DOCUMENTS 5,513,068 A * 4/1996 Girard ......................... 361/685
5,587,877 A * 12/1996 Ryan et al. .................. 361/683
6,301,099 B1 * 10/2001 Felcman et al. ............. 361/683
6,587,096 B2 * 7/2003 Bullister ...................... 345/168

* cited by examiner

Primary Examiner—Hung Van Duong
(74) Attorney, Agent, or Firm—Troxell Law Office PLLC

(57) ABSTRACT

An expandable housing for a electronics device comprises two half covering bodies, which respectively have a bottom board connected with a front board, sideboard and backboard; two sides of a pivoting element are connected to the two bottom boards so as to allow the two half covering bodies to be formed a expansion state while the two bottom boards are expanded into a flat plane and to be assembled into a housing while the two bottom boards are perpendicular to each other. Thereby, the structures of the housing and the frame body can be simplified and a larger space can be obtain when the housing is expanded so that the installment and maintenance of electronics elements become more easy and convenient.

11 Claims, 4 Drawing Sheets

EXPANDABLE HOUSING FOR ELECTRONICS DEVICE

BACKGROUND OF THE INVENTION

1. Field of the Invention

The present invention relates to a housing with a three dimensional structure for a electronics product such as a computer, separable disc driver or stereo, and more particularly to an expandable housing convenient for the disposition, assembly and maintenance of electronics elements in the housing.

2. Description of Related Art

The conventional housing of a personal computer comprises a detachable covering, the covering has three walls surrounding at three sides and an opening. The coving is fixed outside of a frame body after all electronics elements in the computer are assembled on the frame body. And, there is another kind of computer housing that has a detachable upper board and sideboard and a frame body therein for all electronics elements to be assembled thereon. Besides, Taiwan patent No. 440,127 disclosed a computer housing with a base seat and upper cover. A plurality of elastic pins and corresponding raised pieces are disposed respectively on the seat and the upper cover, and the base seat and the upper cover are fixed together by engaging the pins with the raised pieces. Also, Taiwan patent No. 479927 disclosed a twin-doors computer housing, the first and the second sideboards are fixed at two sides of a housing frame body. The computer housings mentioned above are all assembled outside a frame body, and all electronics elements are all assembled in the housing. Therefore, it is inconvenient in assembling and repairing the electronics elements because the space in the housing is very small.

SUMMARY OF THE INVENTION

For further simplifying the structures of a computer housing and frame body, assembling easily and repairing conveniently electronics, the present invention is brought up.

The main object of the present invention is to provide a housing of an electronics product, which has an expandable structure to allow electronics elements to be assembled conveniently in the housing.

Another object of the present invention is to provide a housing of an electronics product, which has not only an expandable structure but also holder grooves for holding electronics elements to allow the housing to function as a frame body so as to simplify the structure of a frame body.

Still another object of the present invention is to provide an expandable housing for an electronics product, which has particular pivoting elements for expanding and assembling the housing conveniently.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
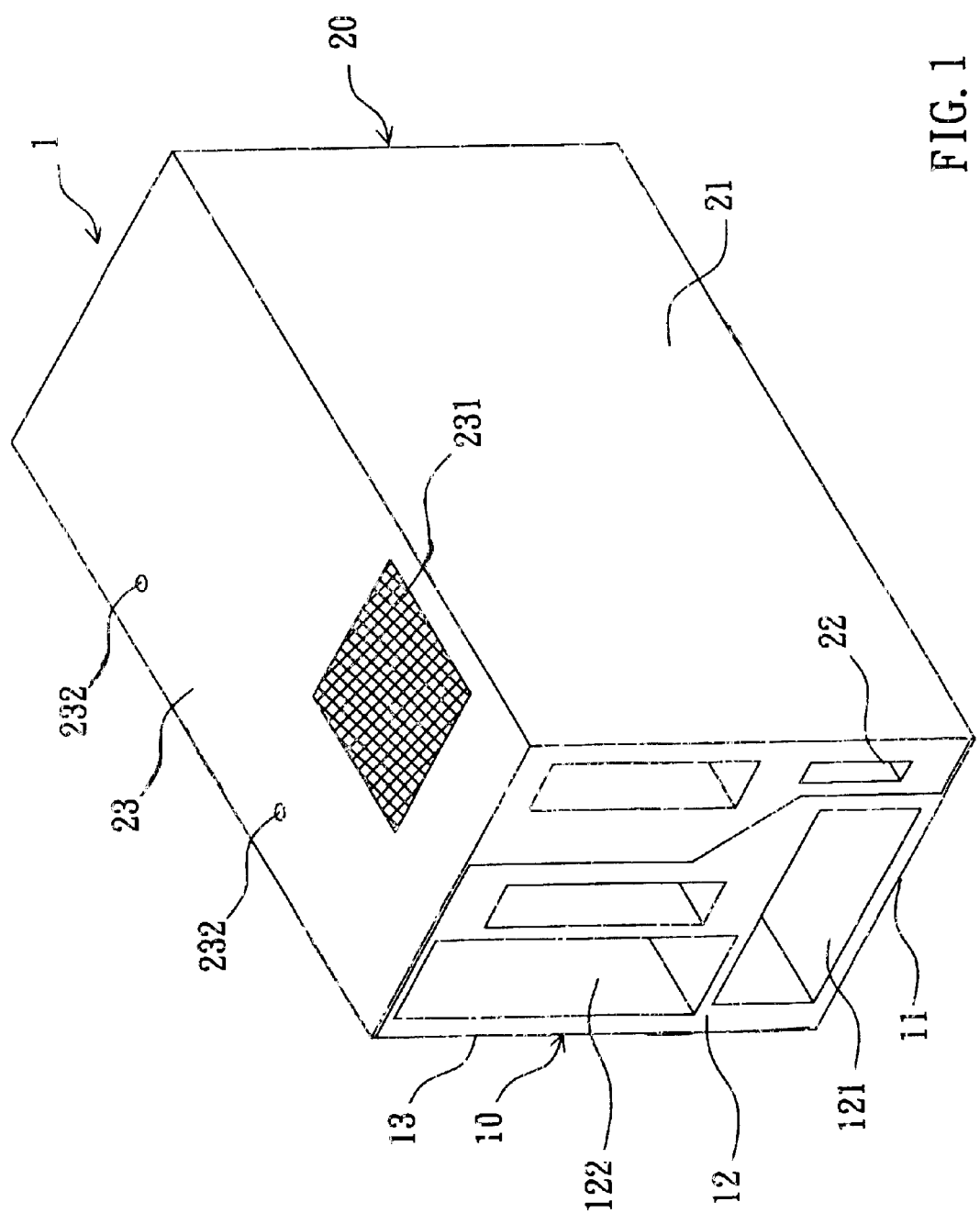
FIG. 1 is a schematic front view of a housing at an assembling state of an embodiment according to the present invention.
Figure 2:
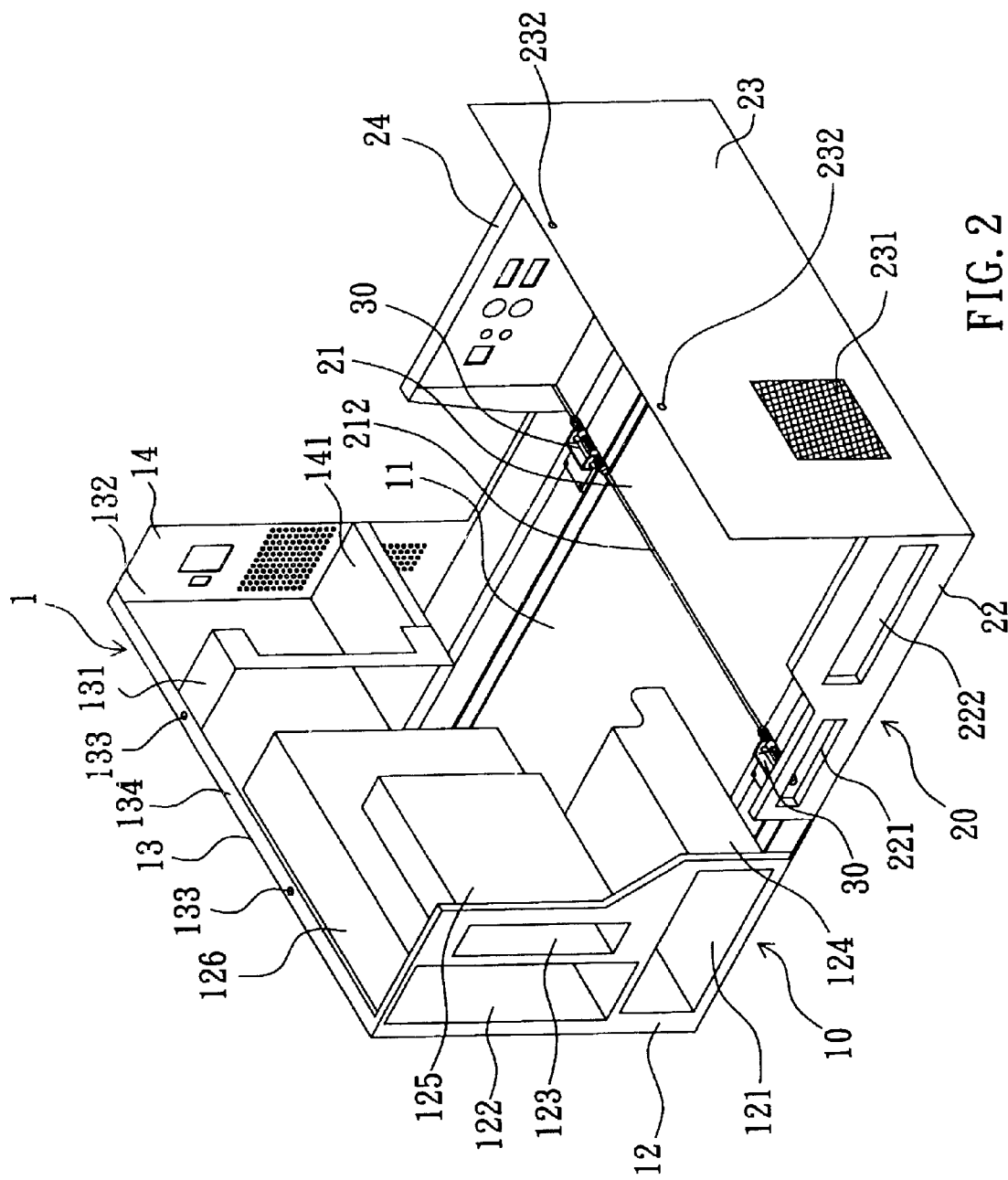
FIG. 2 is a schematic view of a housing at an expansion state of an embodiment according to the present invention.

Please refer to FIGS. 1 and 2. A housing 1 according to the present invention comprises two half covering bodies 10 and 20. As FIG. 2 shows, the half covering body 10 has a bottom board 11 used to connect with a front board 12, sideboard 13 and back board 14. The half covering body 20 has a bottom board 21 used to connect with a concealing board 212, front board 22, sideboard 23 and backboard 24. Two sides of a pivoting element 30 are respectively connected to the bottom plates 11 and 21 so as to expand the bottom plates 11 and 21 to form a plane surface or to assemble to be perpendicular to each other shown in FIGS. 1 and 3.

Groove holes 121, 122, 123, 221 and 222 are respectively disposed in the front boards 12 and 22 to accept electronics elements such as CD driver and floppy disk driver. Groove walls 124, 125 and 126 are formed inside the grove holes 121, 122 and 123 to from spaces for accepting electronics elements.

The sideboard 13 and the backboard 14 are combined with two walls 131 and 141 to form an accepting groove 132 so as to accept an electronics element such as an electric power supply. Two buckling units 133 are disposed at a plate 134 perpendicularly extended from the upper side of the sideboard 13. Heat dissipation zones 142 and 143 comprising a plurality of heat dissipation holes and openings 144 and 145 are disposed at the backboard 14 shown in FIG. 3. The openings 144 and 145 are used to accept a socket or switch. Bottom board 21 is used to connect a lighter PCB.

Figure 3:
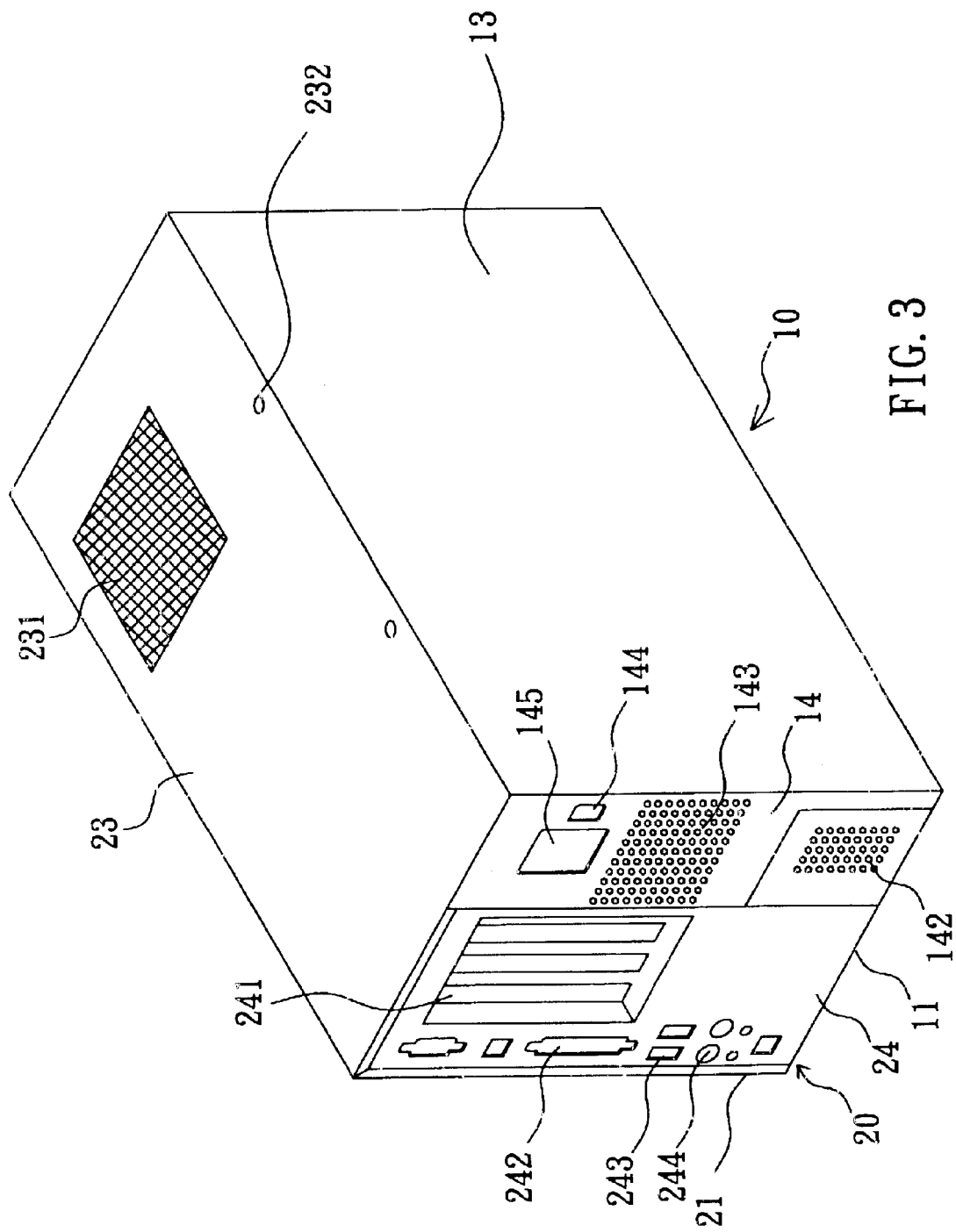
FIG. 3 is a schematic rear view of a housing at an assembly state of an embodiment according to the present invention.

Heat dissipation zone 231 comprising a plurality of heat dissipation holes and two buckling units 232 are disposed in the sideboard 23. The bucking units 133 and 232 are engaged each other to allow the sideboards 13 and 23 to buckle together when the two half housing 10 and 20 are assembled together as FIGS. 1 and 3 show. The buckling units 133 and 232 are disengaged from each other to separate the sideboards 13 and 23 unless outer force is exerted. The buckling units 133 and 232 can be formed respectively as the structures of an indentation groove and raised granule or other structures that can engage each other.

As FIG. 3 shows, the backboard 24 has several holes 241, 242, 243, 244 and etc. to be used to connect with interface connectors or electric acceptors. The bottom board 21 and the sideboard 13 have a same outside look and dimension. And, the sideboard 23 and the bottom board 11 have a same outside look and dimension too. The two front boards 12 and 22 and the two backboards 14 and 24 respectively have a matching type. The two front boards 12 and 22 and the two backboards 14 and 24 are at a face-to-face position after assembling as FIGS. 1 and 3 show. And, the two front boards 12 and 22 and the two backboards 14 and 24 not only have a same outside look and dimension but also their width is equal to the width of the sideboard 23 and bottom board 11 and their height is equal to the height of the bottom board 21 and the sideboard 13. The bottom board 21 and the sideboard 13, the sideboard 23 and bottom board 11 are respectively at a face-to-face position. One end of the front board 22 and one end of the backboard 24 are respectively pressed against the bottom board 11. And, one end of the front board 12 and one end of the backboard 14 are respectively pressed against the sideboard 23.

Figure 4:
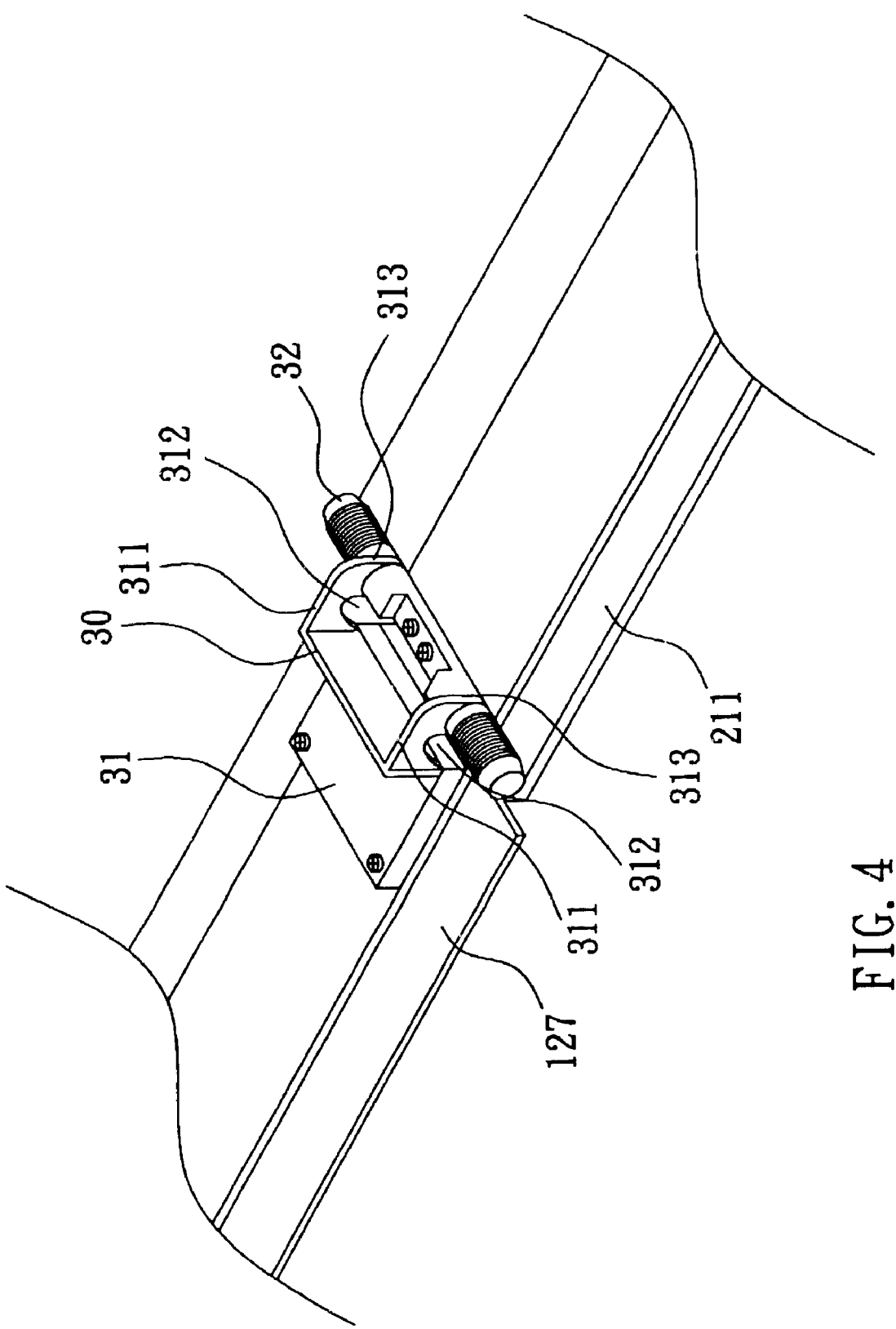
FIG. 4 is a schematic view of a pivoting element of an embodiment according to the present invention.

Please refer to FIGS. 2 and 4. The pivoting element 30 comprises a base seat 31 and shaft 32. Two ears 311 are respectively extended at the two sides of the base seat 31. And, a groove 312, which has a perpendicular section 313 at its outside end and a hole inside the perpendicular section 313 for accepting the pivoting shaft 32, is disposed at the bottom end of each ear 311. The base seat 31 and the shaft 32 are respectively fixed to two fixture plates 127 and 211, which are respectively welded to the bottom boards 11 and 21. The fixture plate 211 is pressed against the perpendicular sections 313 of the two ears 311 to assemble the two bottom boards 11 and 21 to be perpendicular to each other when one end of the fixture plate 211 is rotated upward as FIGS. 1 and 3 show. At this time, the concealing board 212 just enough conceals the gap between the two bottom boards 11 and 21 at the bottom side of the pivoting element 30.

The pivoting element 30 can be directly combined to the two bottom boards 11 and 12. The two bottom boards 11 and 12 can be assembled to be perpendicular to each other or expanded to form a flat plane.

The present invention is to combine the conventional frame body with covering to form into one body and to build an expandable structure through two half covering bodies. Heavier electronics elements such as a power supply, transformer or disk player are places at a fixed half covering body, and then, lighter electronics such as PCBs and transmission interfaces are placed at a detachable half covering body. Thereby, the half covering body with heavier electronics elements becomes more stable and is not moved while another half covering body is expanding, this can stabilize the detaching or assembling action of the housing.

The two expandable half covering bodies according to the present invention can allow the operation space to become broader. Therefore, the installment and maintenance of each electronics element become more convenient and parts density in an installment space can be increased. Besides, the disposition of the accepter grooves can allow the installment of each electronics element to be more convenient. And, arranging heavier electronics elements to be installed in the fixed half covering body and lighter electronics elements to be installed in the detachable half covering body can make the housing more convenient to be detached and advantageous in maintenance and installment operation. Although the description mentioned above is stressed on the housing of a personal computer, but it is easy for a person skilled in the art to apply the technology disclosed by the present invention on the housings of other electronics products.

What is claimed is:

1. An expandable housing for electronics device, comprising two half covering bodies, one half body having a bottom board connected with one front board, sideboard and backboard; another half covering having another bottom board connected with another front board, sideboard and backboard; two sides of a pivoting element being connected to said two bottom boards so as to allow said two half covering bodies to be at an expansion state while said two bottom boards are expanded into a flat plane and to be assembled into a housing while said two bottom boards are perpendicular to each other.

2. The housing according to claim 1, wherein, said pivoting element comprises a base seat and pivoting shaft; two ears are extended from one side of said base seat; a perpendicular section is disposed at the outside end of each said ear; a hole is disposed at said each perpendicular section to accept said pivoting shaft; said base seat and said pivoting shaft are respectively connected to said bottom board and said another bottom board so that said another bottom board is pressed against said perpendicular sections of said two ears to allow said two bottom to be assembled to be perpendicular to each other while said another bottom board is rotated upward.

3. The housing according to claim 2, wherein, said another bottom board is connected to a concealing board at one side thereof connected to said pivoting element.

4. The housing according to claim 3, wherein, a plurality of groove holes are disposed in said front board and said another front board so as to accept electronics elements.

5. The housing according to claim 4, wherein, a groove wall is disposed inside said groove hole so as to form a space to accept an electronics element.

6. The housing according to claim 5, wherein, a plurality of buckling units are disposed at the upper side of said sideboard; and, a plurality of another buckling units corresponding to said buckling units are disposed at another sideboard, so that said two sets of buckling units can be engaged one another while said two half covering bodies are assembled together.

7. The housing according to claim 6, wherein, said two front boards and said two backboards respectively have matching shapes; said two assembled front boards and said two assembled backboards have a same outside look and dimension; one end of said another front board and one end of another backboard are pressed against said bottom board; one end of said front board and one end of said backboard are pressed against said another sideboard.

8. The housing according to claim 7, wherein, said base seat and said shaft are respectively fixed to two fixture plates through screws, said two fixture plates are respectively welded to said two bottom boards.

9. The housing according to claim 8, wherein, said sideboard and said backboard combined with two walls to form an acceptor space.

10. The housing according to claim 9, wherein, said buckling units are disposed on the surface of a plate extended perpendicularly from the upper side of said sideboard; said two sets of buckling units respectively have structures of indentation groove and raised granule.

11. The housing according to claim 10, wherein, said another backboard has holes; said backboard has heat dissipation zones comprising a plurality of heat dissipation holes respectively and openings.

* * * * *